United States Patent
Itsumi et al.

(10) Patent No.: US 8,045,073 B2
(45) Date of Patent: Oct. 25, 2011

(54) LIQUID CRYSTAL DISPLAY DEVICE HAVING SPACER PROVIDED IN RED PIXEL(S)

(75) Inventors: Ikumi Itsumi, Kuwana (JP); Fumikazu Shimoshikiryoh, Matsusaka (JP); Masae Kawabata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 311 days.

(21) Appl. No.: 12/440,649

(22) PCT Filed: Sep. 20, 2007

(86) PCT No.: PCT/JP2007/068269
§ 371 (c)(1),
(2), (4) Date: Mar. 10, 2009

(87) PCT Pub. No.: WO2008/081624
PCT Pub. Date: Jul. 10, 2008

(65) Prior Publication Data
US 2009/0251627 A1    Oct. 8, 2009

(30) Foreign Application Priority Data
Dec. 28, 2006   (JP) ................................. 2006-355052

(51) Int. Cl.
*G02F 1/1343* (2006.01)
*G02F 1/1339* (2006.01)

(52) U.S. Cl. .......................................... 349/38; 349/156
(58) Field of Classification Search .............. 349/33, 349/38, 109, 141, 143, 106, 124, 156
See application file for complete search history.

(56) References Cited

U.S. PATENT DOCUMENTS

| | | | |
|---|---|---|---|
| 6,184,959 B1 * | 2/2001 | Izumi | 349/124 |
| 6,771,344 B2 * | 8/2004 | Lyu et al. | 349/143 |
| 7,009,668 B2 * | 3/2006 | Van De Witte et al. | 349/113 |
| 7,760,302 B2 * | 7/2010 | Mori et al. | 349/129 |
| 2004/0021808 A1 | 2/2004 | Johgan et al. | |
| 2005/0046779 A1 * | 3/2005 | Sumi et al. | 349/155 |
| 2005/0259210 A1 * | 11/2005 | Lee et al. | 349/156 |
| 2006/0256274 A1 | 11/2006 | Johgan et al. | |

FOREIGN PATENT DOCUMENTS

| | | |
|---|---|---|
| JP | 11-2717 | 1/1991 |
| JP | 10-186374 A | 7/1998 |
| JP | 11-353919 | 12/1999 |
| JP | 2002-196338 | 7/2002 |
| JP | 2003-172937 | 6/2003 |
| JP | 2003-222880 | 8/2003 |
| JP | 2004-61904 | 2/2004 |

OTHER PUBLICATIONS

International Search Report for PCT/JP2007/068269 mailed Oct. 30, 2007.
Supplementary EP Search Report mailed May 4, 2010 in corresponding EP application 07807633.8.

* cited by examiner

*Primary Examiner* — Akm Ullah
(74) *Attorney, Agent, or Firm* — Nixon & Vanderhye P.C.

(57) ABSTRACT

The present invention provides a liquid crystal display device which can more improve a luminance when the liquid crystal display device includes a column spacer. The present invention is a liquid crystal display device including a pair of substrates and a liquid crystal layer interposed between the pair of substrates, and the liquid crystal display device having a red pixel, a green pixel, and a blue pixel, wherein a column spacer structure is arranged in the red pixel among three pixels of the red, green, and blue pixels, and the red pixel has the smallest aperture ratio of the three pixels.

15 Claims, 5 Drawing Sheets

LIQUID CRYSTAL DISPLAY DEVICE HAVING SPACER PROVIDED IN RED PIXEL(S)

This application is the U.S. national phase of International Application No. PCT/JP2007/068269 filed 20 Sep. 2007 which designated the U.S. and claims priority to Japanese Patent Application No. 2006-355052 filed 28 Dec. 2006, the entire contents of each of which are hereby incorporated by reference.

TECHNICAL FIELD

The present invention relates to a liquid crystal display device. More specifically, the present invention relates to a liquid crystal display device including a column spacer as means for maintaining a cell gap.

BACKGROUND ART

A liquid crystal display device provides display by controlling optical characteristics of light emitted from a light source using a liquid crystal layer and the like in a liquid crystal display panel. Such a liquid crystal display device has been widely used in various fields, using its features such as slim profile, lightweight, and low power consumption. The liquid crystal display panel that is a main member of such a liquid crystal display device generally has a structure where a liquid crystal layer is interposed between a pixel array substrate and a color filter substrate, and a thickness (cell gap) of the liquid crystal layer is maintained by a spacer arranged between the substrates. Examples of the spacer include spherical spacers made of plastic, an inorganic material, and the like; and column spacers made of a resin material, and the like. Among these, the column spacer is excellent in that it can be directly formed on a substrate using a photosensitive resin and the like, for example, by a photolithography method, and such a column spacer can be arranged with high precision.

An arrangement position of such a column spacer can be determined in accordance with a desired spacer density. Generally, as shown in FIG. 8, one spacer is arranged in every pixel of red pixel R, green pixel G, and blue pixel B. If a column spacer 1 overlaps with a pixel electrode 10 arranged on the pixel array substrate, alignment of liquid crystals near the column spacer 1 tends to be disturbed. So, the pixel electrode 10 is provided with a notch in a region where the column spacer 1 is to be formed so that the pixel electrode 10 does not overlap with the column spacer 1. Due to the notch of the pixel electrode 10, an aperture ratio of the pixel is reduced, and the entire luminance is reduced. For this problem, a configuration in which the column spacer 1 is arranged in a region facing blue and red color filters or in a region facing only blue color filter among red, green, and blue color filters is disclosed as a configuration in which the reduction in aperture ratio is suppressed (for example, refer to Patent Document 1)

[Patent Document 1]
Japanese Kokai Publication No. 2002-196338

DISCLOSURE OF INVENTION

However, such a configuration in which the number of the notch of the pixel electrode is just decreased has still room for improvement in order to increase a luminance while an appropriate chromaticity of a displayed color is maintained.

The present invention has been made in view of the above-mentioned state of the art. The present invention has an object to provide a liquid crystal display device which can more improve a luminance when the liquid crystal display device includes a column spacer.

The present inventors made various investigations on a liquid crystal display device which can more improve a luminance when the liquid crystal display device includes a column spacer. The inventors noted that an aperture ratio can be improved by arranging a column spacer and its base in not every pixel, and also noted a color of the pixel where the column spacer and its base are arranged. Then, the inventors considered a relationship between a reduction in aperture ratio and its influence on a luminance in each of three pixels of red, green, and blue pixels. As a result, the inventors found that if a column spacer and its base are formed only in the red pixel and the red pixel has the smallest aperture ratio of the three pixels, the influence on the luminance, due to the reduction in aperture ratio caused by arranging the column spacer and its baser can be reduced and display with high luminance can be provided. Thus, the above-mentioned problems can be admirably solved, leading to completion of the present invention.

That is, the present invention is a liquid crystal display device including a pair of substrates and a liquid crystal layer interposed between the pair of substrates, and the liquid crystal display device having a red pixel, a green pixel, and a blue pixel, wherein a column spacer structure is arranged in the red pixel among three pixels of the red, green, and blue pixels, and the red pixel has the smallest aperture ratio of the three pixels.

The present invention is mentioned in more detail below.

The liquid crystal display device of the present invention includes a pair of substrates and a liquid crystal layer interposed between the pair of substrates, and has red, green, and blue pixels. The above-mentioned pair of substrates generally includes a pair of electrodes on the liquid crystal layer side, and using the pair of electrodes, a voltage is applied to the liquid crystal layer, thereby controlling ON and OFF of liquid crystal display. For example, in IPS (In-Plane-Switching) mode, a pair of electrodes are arranged on either one of the pair of substrates, and in TN (Twisted Nematic) mode and VA (Vertical Alignment) mode, electrodes are formed on a pair of substrates to face each other. According to an active matrix driving liquid crystal display device, a scanning line (gate wiring) and a signal line (source wiring) are generally arranged to be perpendicular to each other on at least one of the pair of substrates, and a thin film transistor (TFT) that is a switching element is arranged at an intersection of the two lines. According to such a configuration, matrix-pattern regions surrounded by the scanning line and the signal line are pixels, and the pixels are each independently driven and controlled by different TFTs. In addition, a storage capacitor wiring (Cs wiring) is arranged to form a storage capacitance, and thereby a voltage of the liquid crystal layer when the TFT is in OFF state can be stabilized. The "pixel" used herein means a partition unit for processing image display, and includes not only a display region where the pixel electrode is formed but also a non-display region which is used for driving the pixel and has no contribution to display. Examples of the non-display region in the pixel include regions where the wirings such as a scanning line and a signal line are formed and a region where the TFT is formed. Accordingly, the pixels gather to constitute the entire display screen. One pixel corresponds to either one color of red, green, and blue. Color images are displayed using a pixel electrode, a colored layer, and the like, arranged in each pixel. In the present description, the red means a color having a dominant wavelength of 570 to 780 nm, green means a color having a dominant wavelength of 480 to 570 nm, and blue means a color having a dominant wavelength of 380 to 480 nm.

According to the above-mentioned liquid crystal display device, a column spacer structure is arranged in the red pixel among the three pixels, and the red pixel has the smallest aperture ratio of the three pixels. That is, as shown in FIG. 7, the column spacer structure is not formed in the green and blue pixels, and the column spacer structure is formed substantially only in the red pixel, and so, a large aperture ratio can be secured in the green and blue pixels. The red, green, and blue pixels generally have substantially the same area. So, in the present invention, the red pixel generally has the smallest aperture area of the three pixels. The aperture ratio of the red pixel preferably accounts for 50% or more of the aperture ratio of each of the green and blue pixels.

The reason why the column spacer structure is arranged in the red pixel among the three pixels is mentioned below. First, a luminance perceived by human (luminous efficacy characteristics is compared among the three pixels of red, green, and blue, which shows that an increase in the aperture ratio of the green pixel leads to the biggest improvement in the luminance. Accordingly, the location of the column spacer can be mentioned as follows: (1) the red pixel; (2) the blue pixel; and (3) the red and blue pixels. Compared to the chromaticity when a ratio of the aperture ratio is red:green:blue=1:1:1, a change in chromaticity in each of the above-mentioned three cases is calculated as one example. For (1), x is −0.015 and y is −0.002. For (2), x is +0.016 and y is +0.022. For (3), x is 0 and y is +0.021. If the y is changed to the positive direction, the aperture ratio of the green pixel needs to be reduced. If this change is compensated by color of light emitted from a backlight, the luminance is reduced. So, the case (1) the red pixel is suitable as the position where the column spacer structure is arranged. In addition, the case (1) the red pixel is suitable because the change to the negative direction tends to decrease yellowness of liquid crystal. Also in the other cases, the tendency, whether the x and y are changed to a positive direction or a negative direction, is the same.

The above-mentioned column spacer structure is at least one of a column spacer and a base for spacers. The above-mentioned column spacer is a column member for maintaining a cell gap. The column spacer can be formed by forming a resin film over the entire surface and patterning it by photolithography, for example. The above-mentioned column spacer may be a single layer or a multilayer. The above-mentioned column spacer is preferably a photo spacer which can be formed by photolithography, and more preferably a multilayer photo spacer prepared by stacking layers which are formed simultaneously when other members are formed by photolithography. The multilayer photo spacer is made of the same material as a material for other members such as a colored layer, which can significantly efficiently perform production steps. The above-mentioned base for spacers is a bulge part that is a foundation of the column spacer, and the base is formed by partially arranging a foundation layer in a layer below the column spacer. Examples of the material for the above-mentioned foundation layer include a black matrix (BM), a colored layer, a metal wiring, an insulating film, and an electrode.

Preferable embodiments of the liquid crystal display device of the present invention are mentioned in more detail below.

It is preferable that the liquid crystal display device includes a backlight, wherein among red, green, and blue lights emitted by the backlight, the red light is emitted at the highest intensity. In the present invention, the column spacer structure is arranged in the red pixel, and so the red pixel has the smallest aperture ratio of the three pixels. So, a backlight which emits red light at an intensity relatively higher than that of any other color light is used, and thereby the balance among the aperture ratios of the respective colors can be compensated, and display with excellent color can be provided. An emission spectrum of a typical backlight (three-wavelength fluorescence tube) used for the liquid crystal display device can be adjusted by varying a compounding ratio of fluorescent substances. According to the present embodiment, a chromaticity of a displayed color can be adjusted also by a backlight, and so, display with improved luminance can be provided while an appropriate chromaticity of the displayed color is maintained.

It is preferable that the liquid crystal display device includes a scanning line on at least one of the pair of substrates, wherein a part of the scanning line in the green or blue pixel has a width smaller than a width of the scanning line in the red pixel. The column spacer structure is also arranged in the pixels other than the red pixel, conventionally. So, also in the green and blue pixels, the width of the scanning line is designed to be larger in order to use the scanning line as the base for the column spacer, which is not needed in the present invention. Accordingly, in the present embodiment in which the scanning line in the part which is conventionally used as the base for the column spacer is removed, the aperture ratio in the green or blue pixel is improved, leading to improvement in luminance. It is more preferable that the scanning line in each of the green and blue pixels has a width smaller than that of the scanning line in the red pixel.

The present invention is preferably employed if an area of the column spacer structure accounts for 2% or more of an area of one pixel. If the proportion of the area of the column spacer structure in one pixel is 2% or more, the reduction in aperture ratio, caused by arrangement of the column spacer structure, has an influence on visibility. The above-mentioned area of one pixel means an area of a region surrounded by the center lines of the scanning lines and the center lines of the signal lines.

It is preferable that the liquid crystal display device includes a pixel electrode in each pixel, wherein an area of the pixel electrode in the green and blue pixels is larger than an area of the pixel electrode in the red pixel. If the column spacer structure is arranged on the pixel electrode, alignment of liquid crystals near each column spacer is often disturbed. So, it is preferable that in the red pixel, the area of the pixel electrode is decreased in accordance with the size of the column spacer structure. In the green and blue pixels, the column spacer structure is not formed, and so, it is preferable that the pixel electrode is formed to have a larger area to increase the aperture ratio.

If the pixel electrode in the green and blue pixels have an area larger than that of the pixel electrode in the red pixel, it is preferable that the red pixel has the highest storage capacitance of the three pixels. In a Cs-on-Common system, for example, the storage capacitance is formed by arranging an insulating film between the storage capacitor wiring and the pixel electrode or a conductive part electrically connected to the pixel electrode, and in a Cs-on-Gate system, the storage capacitance is formed by arranging an insulating film between the scanning line and the pixel electrode or the conductive part electrically connected to the pixel electrode. If the aperture ratio of the pixel varies due to the difference of the area of the pixel electrode, the liquid crystal capacitance formed between the pixel electrode and the common electrode is different between the respective pixels. So, a drawing voltage (Vd) from the outside varies among the respective pixels, which causes a flicker. According to the present embodiment, the area of the pixel electrode positioned in the red pixel is smaller than the area of the pixel electrode positioned in the other pixels, and so, the liquid crystal capacitance of the red pixel is smaller than that of any other pixels. So, the storage capacitance of the red pixel is set to be larger than that of each of the green and blue pixel, and thereby generation of the flicker can be suppressed. In the Cs-on-Common system, it is preferable that the liquid crystal display device includes a storage capacitor wiring on at least one of the pair of substrates, wherein a part of the storage capacitor wiring in the red pixel has a width larger than a width of the storage capacitor wiring in the green and blue pixels. If the storage capacitor wiring in the red pixel is formed to have a width larger than a width of the storage capacitor wiring in the other pixels, a larger storage capacitance can be easily secured in the red pixel.

If the pixel electrode in the green and blue pixels has an area larger than an area of the pixel electrode in the red pixel, it is preferable that the liquid crystal display device includes a scanning line, a signal line, a switching element, and the pixel electrode on one of the pair of substrates, the switching element being electrically connected to the scanning line and the signal line, the pixel electrode being electrically connected to a drain electrode of the switching element, and the liquid crystal display device further including a common electrode on the other of the pair of substrates, wherein the pixel electrode and the common electrode form a liquid crystal capacitance (Clc), one of the pixel electrode and the drain electrode, and one of a storage capacitor wiring and the scanning line, form a storage capacitance (Cs), the scanning line and the drain electrode form a gate drain capacitance (Cgd), and a ratio between the gate drain capacitance (Cgd), and a total of a liquid crystal capacitance (Clc), the storage capacitance (Cs) and the gate drain capacitance (Cdg) is the same among the red, green, and blue pixels. That is, it is preferable that a value of Cgd/(Clc+Cs+Cgd) is the same among the red, green, and blue pixels. In the Cs-on-Common system, the storage capacitance is formed by arranging an insulating film between the storage capacitor wiring and the pixel electrode or the drain electrode. In the Cs-on-Gate system, the storage capacitance is formed by arranging an insulating film between the scanning line and the pixel electrode or the drain electrode. The drain electrode used herein is not especially limited as long as it is a conductive part electrically connected to the pixel electrode. In the present embodiment, "the value of Cgd/(Clc+Cs+Cgd) is the same" means the value is substantially the same unless the effects of the present embodiment are sacrificed, and specifically means than a difference in drawing voltage (Vd) calculated from the following formulae (1) to (3) is 100 mV or less, and preferably 50 mV or less. As a method of adjusting the value of Cgd/(Clc+Cs+Cgd), a method in which the area where the storage capacitance is formed is varied such as the above-mentioned method in which the width of the storage capacitor wiring is varied among the respective pixels is mentioned, for example. If the value of Cgd/(Clc+Cs+Cgd) is the same among the red, green, and blue pixels, the drawing voltage (Vd) from the outside can be the same among the respective pixels, and generation of the flicker can be suppressed, and the luminance can be improved.

$$Vd = Vgpp \times Cgd/Cpix \qquad (1)$$

$$Vgpp = Vgh - Vgl \qquad (2)$$

$$Cpix = Clc + Cs + Cgd \qquad (3)$$

In the above formulae (1) to (3), Vd represents a drawing voltage from the outside; Vgpp represents a difference between the maximum value and the minimum value of the gate voltage; Cgd represents a parasitic capacitance between the gate electrode and the drain electrode of the TFT part; Cpix represents a pixel capacitance; Vgh represents the maximum value of the gate voltage; Vgl represents the minimum value of the gate voltage; Clc represents a liquid crystal capacitance; and Cs represents a storage capacitance. The Vgpp is generally the same among the respective pixels, and so, if the value of Cgd/(Clc+Cs+Cgd) is the same among the pixels, the drawing voltage (Vd) can be the same among the respective pixels.

Further, if the pixel electrode in the green and blue pixels has an area larger than an area of the pixel electrode in the red pixel, it is preferable that a linear alignment control structure divides each of the red, green, and blue pixels into a plurality of alignment regions different in alignment direction of liquid crystals, and an area ratio among the plurality of alignment regions is the same among the red, green, and blue pixels. That is, in the liquid crystal display device, it is preferable that an area ratio among the alignment regions in the red pixel is the same as an area ratio among the alignment regions in each of the green and blue pixels. The above-mentioned linear alignment control structure is not especially limited as long as it is a structure which linearly extends as viewed in the normal direction of the substrate surface and contributes to alignment property of the liquid crystal. For example, a projection which projects to the liquid crystal layer side, a slit provided for an electrode used to apply a voltage to the liquid crystal layer, may be mentioned. If the alignment control structure is formed, the liquid crystal in Vertical Alignment mode is generally aligned in such a way that a direction of a long axis of the liquid crystal is vertical to a wall surface of the alignment control structure under no voltage application, and the liquid crystal begins to be inclined from the alignment control structure continuously, by application of a voltage, in such a way that the direction of the long axis is inclined toward a direction parallel to the alignment control structure. Accordingly, the alignment control structure is formed to divide the pixel into a plurality of regions, and thereby the liquid crystal in each divided region is aligned in the same direction. Such a region where the liquid crystal is aligned in the same direction is called alignment region (domain). Thus, if the plurality of alignment regions different in alignment direction are formed, viewing angle characteristics can be improved. In order to uniform the viewing angle characteristics in up-and-down and right-and-left directions, it is preferable that at least four alignment regions are arranged. If the area ratio among the alignment regions different in alignment direction of the liquid crystal is the same among the respective pixels, the viewing angle characteristics can be improved. Particularly in order to uniform the viewing angle characteristics between up and down directions, and between right and left directions, it is preferable that a region where the liquid crystal is aligned in the right direction and a region where the liquid crystal is aligned in the left direction have the same area ratio, and a region where the liquid crystal is aligned in the up direction and a region where the liquid crystal is aligned in the low direction have the same area ratio. In the present embodiment, "the same area ratio" means that the regions have substantially the same area ratio unless the effects of the present embodiment are sacrificed, and means that a difference in the area ratio is within 5% or less, and preferably 1% or less. In the present invention, the column spacer structure is arranged in the red pixel, and so, if the linear alignment control structure is formed in the red pixel in the same pattern as in the other pixels, the area of the alignment region near the column spacer structure is decreased, and the area ratio among the alignment regions is different between the red pixel and the other pixels. The area ratio among the alignment regions is adjusted to be the same among the respective pixels, and thereby the entire viewing angle characteristics can be adjusted. The following methods can be mentioned as a method of adjusting the area ratio, for example. A method in which the position of the alignment control structure is varied; a method in which a distance between the alignment control structures is varied; a method in which an area of the pixel electrode is varied; a method in which a width of a black matrix (BM) is varied; and a method in which a length and/or a width of the alignment control structure are/is varied. A balance of the viewing angle characteristics is enhanced if the liquid crystal is aligned to four oblique directions in one pixel, and as a result, a wide viewing angle can be obtained. As such a method in which the four alignment regions different in alignment direction are formed, a method in which the pixel is divided by a linear alignment control structure which has a V-shape as viewed in plane is mentioned, for example.

Effect of the Invention

According to the liquid crystal display device of the present invention, the column spacer structure is formed in the red pixel among the three pixels of red, green, and blue, and so, a luminance is improved while an appropriate chromaticity of a displayed color is maintained.

BEST MODES FOR CARRYING OUT THE INVENTION

The present invention is mentioned in more detail below with reference to Embodiments using drawings, but not limited to only these Embodiments.

Embodiment 1

FIG. 1 is a planar view schematically showing pixels of red, green, and blue in a liquid crystal display device in Embodiment 1. The liquid crystal display device in the present Embodiment has a configuration in which an array substrate and a color filter substrate face each other with a liquid crystal layer therebetween. Such a liquid crystal display device is driven by an active matrix system.

As shown in FIG. 1, on the array substrate, a source wiring (signal line) 21 and a gate wiring (scanning line) 22 are arranged in vertical and horizontal directions, and at near an intersection of the source wiring 21 with the gate wiring 22, a TFT 23 that is a switching element is arranged. A pixel electrode 10 made of ITO and the like is arranged to be surrounded by the source wiring 21 and the gate wiring 22. The pixel electrode 10 is electrically connected to a drain electrode of the TFT 23 through a contact hole. A storage capacitor wiring (Cs wiring) 25 is arranged to pass through the center of a pixel, in parallel to the gate wiring 22.

According to the present Embodiment, a column spacer 1 is arranged at a position overlapping with the gate wiring 22, only in a red pixel R. A base 2 on which the column spacer 1 is arranged is arranged in a layer below the column spacer 1. In the red pixel R, the pixel electrode 10 has a notch in order for the pixel electrode 10 not to overlap with the base 2. A part of the gate wiring 22 in the region where the column spacer 1 is formed in the red pixel R, has a width larger than a width of the gate wiring 22 which is used as the base 2 on which the column spacer 1 is arranged in a green pixel G and a blue pixel B.

The storage capacitor wiring 25 forms a storage capacitance Cs with the pixel electrode 10 which is arranged on the storage capacitor wiring 25 with an insulating film therebetween. According to the present Embodiment, the pixel electrode 10 has a notch in the red pixel R, and so, a liquid crystal capacitance in the red pixel R is smaller than that in each of the green pixel G and the blue pixel B. Accordingly, in order to compensate this, a part of the storage capacitor wiring 25 in the red pixel R has a width larger than that of the storage capacitor wiring 25 in the green pixel G and the blue pixel B. The following methods are mentioned as a method of determining the width of the storage capacitor wiring 25, for example. First, it is determined if a Cs/Clc is a certain standard value or more in order to check whether response of liquid crystal can be secured in each pixel. Under the condition that the Cs/Clc is a certain standard value or more, each of the following values (1) to (3):

$$Vd = Vgpp \times Cgd/Cpix \quad (1);$$

$$Vgpp = Vgh - Vgl \quad (2); \text{ and}$$

$$Cpix = Clc + Cs + Cgd \quad (3)$$

is adjusted to be the same among the red, green, and blue pixels. In the above formulae (1) to (3), Vd represents a drawing voltage from the outside; Vgpp represents a difference between the maximum value and the minimum value of the gate voltage; Cgd represents a parasitic capacitance between the gate electrode and the drain electrode of the TFT part; Cpix represents a pixel capacitance; Vgh represents the maximum value of the gate voltage; Vgl represents the minimum value of the gate voltage; Clc represents a liquid crystal capacitance; and Cs represents a storage capacitance. The Vgpp is generally the same among the respective pixels, and so it is preferable to adjust a Cgd/(Clc+Cs+Cgd) to be the same among the pixels.

FIG. 2 is a planar view schematically showing an embodiment in which the pixels shown in FIG. 1 are provided with an alignment control structure such as a rib 32 and an electrode slit 31. The electrode slit 31 is provided for the pixel electrode 10 in the array substrate. The projection (rib) 32 is arranged in the color filter substrate. The rib 32 is made of an insulator. The rib 32 and the electrode slit 31 have a V shape, and alternately arranged in parallel to each other. The rib 32 and the electrode slit 31 are arranged so that one pixel is divided into four or more alignment regions (domains) (10 alignment regions in FIG. 2) where the liquid crystals are aligned in four oblique directions. An area ratio among these four regions is set to be almost the same among the red pixel R, the green pixel G, and the blue pixel B. Specifically, only in the red pixel R, the rib 32 and the electrode slit 31 are moved in parallel in the up, down, right, or left direction while a distance between the rib 32 and the electrode slit 31 is maintained to be the same as a distance between the green pixel G and the blue pixel B, and thereby, the area ratio among the four alignment regions is adjusted to be almost the same as the area ratios in the green pixel G and the blue pixel B. So, the arrangement of the rib 32 and the electrode slit 31 in the red pixel R is different from those in the green pixel G and the blue pixel B.

FIG. 3-1 is a cross-sectional view schematically showing the pixel taken along dashed line A-B in FIG. 1 and shows a cross-section of the column spacer 1 and its base 2 formed in the red pixel R. As shown in FIG. 3-1, in an array substrate 3, the gate wiring 22, a gate insulating film 17, a passivation film 18, and an interlayer insulating film 19 are stacked (in this order) on a transparent substrate 16 toward a liquid crystal layer 5. In a color filter substrate 4, a black matrix (BM) 12, a red colored layer 13a, a green colored layer 13b, and a blue colored layer 13c, a common electrode 14 made of ITO, and the resin layer 15 are stacked in this order on a transparent substrate 11 toward the liquid crystal layer 5.

The column spacer 1 is a multilayer photo spacer composed of a multilayer body including the green colored layer 13b, the blue colored layer 13c, the common electrode 14, and the resin layer 15. The base 2, which is the part surrounded by the dotted line in the figure, is composed of: a base 2b arranged in the color filter substrate 4; and a base 2a arranged in the array substrate 3. The base 2b is composed of the BM 12 and the red colored layer 13a. The base 2a is composed of the gate wiring 22, the gate insulating film 17, the passivation film 18, and the interlayer insulating film 19. The base 2b includes the BM 12 as a foundation layer. The base 2a includes the gate wiring 22 as a foundation layer. The spacer in the present Embodiment is composed of the column spacer 1, the base 2a in the array substrate 3, and the base 2b in the color filter substrate 4. The spacer causes no reduction in display qualities due to light leakage even though being arranged in the display region, because the BM 12 that is one component of the base 2 has light-shielding property. A part of each layer constituting the spacer is made of the same material as a material for the colored layer in the pixel, that is, composed of the red colored layer 13a, the green colored layer 13b, and the blue colored layer 13c. So, the spacer can be produced with efficiency. The column spacer 1, the green colored layer 13b, the blue colored layer 13c, and the BM 12 are formed to have different areas. This is because a patterning accuracy at the time of forming each layer is taken into consideration. That is, a variation in thickness of the column is prevented even if the position where the layers are formed varies. As mentioned above, the BM 12 needs to have a large area in order to prevent light leakage. Thus, the column spacer and its base, having the multilayer structure, needs to have an area larger than that of a column spacer and its base, having no multilayer structure. Accordingly, the present invention can be particularly preferably applied to the case that the column spacer and its base having a multilayer structure are used.

FIG. 3-2 is a cross-sectional view schematically showing the pixel taken along dashed line C-D in FIG. 1, and shows a cross section of a part where the column spacer is conventionally arranged in the green pixel G or the blue pixel B. As shown in FIG. 3-2, in the array substrate 3, the gate wiring 22, the gate insulating film 17, the passivation film 18, and the interlayer insulating film 19 are stacked in this order on the transparent substrate 16 toward the liquid crystal layer 5. In the color filter substrate 4, the black matrix (BM) 12, the green colored layer 13b or the blue colored layer 13c, and the common electrode 14 are stacked in this order on the transparent substrate 11 toward the liquid crystal layer 5. The green pixel G and the blue pixel B also have the configuration shown in FIG. 3-1, conventionally. In the present Embodiment, however, in the green pixel G and the blue pixel B, the column spacer 1 and its base 2 are not formed, and so, the pixel electrode 10 is provided with no notch. Further, the gate wiring 22 in the green pixel G and the blue pixel B is formed to have a width smaller than a width of the gate wiring 22 in the red pixel R. So, the area of the BM 12 also can be decreased. As a result, the aperture ratio can be improved in comparison to that in a conventional configuration.

FIG. 4 is a graph showing one example of a proportion of the column spacer structure in an area of one pixel in each screen size of the liquid crystal display device. The above-mentioned screen size corresponds to a length of a diagonal line in a rectangular screen. As shown in FIG. 4, the proportion of the column spacer structure in one pixel area is increased as the screen size is decreased. When the screen size is 30-inch or less, the proportion of the column spacer structure is 2% or more in one pixel area. FIG. 5 is a graph showing one example of a proportion of the column spacer structure in one pixel area, in each resolution of the pixel in the liquid crystal display device. As shown in FIG. 5, the proportion of the column spacer structure is 2% or more in one pixel area when the resolution of the pixel is FHD, WXGA×2, and FHD×2.

FIG. 6 is a graph showing one example of an intensity ratio among the respective color components (hereinafter also referred to as a backlight intensity ratio) of light emitted from a backlight. According to the present Embodiment, the aperture ratio of the red pixel is smaller than that of each of the green and blue pixels because the column spacer structure is arranged in the red pixel. According to the present Embodiment, the intensity of the red component of light emitted from the backlight light is set to be larger than that of other colors, thereby adjusting the chromaticity balance. With regard to a way of adjusting the chromaticity balance, for example, if a ratio of the aperture ratio among the respective colors is red:green:blue=0.8:1:1 as shown in FIG. 6, the backlight intensity ratio is set to be inverse of the ratio of the aperture ratio, i.e., red:green:blue=1.25:1:1, excellent display with adjusted chromaticity can be provided.

The present application claims priority under the Paris Convention and the domestic law in the country to be entered into national phase on Patent Application No. 2006-355052 filed in Japan on Dec. 28, 2006, the entire contents of which are hereby incorporated by reference.

The terms "or more" and "or less" in the present description means that the value described (boundary value) is included.

BRIEF DESCRIPTION OF DRAWINGS

FIG. 3-1 is a schematic cross-sectional view of the pixel taken along dashed line A-B in FIG. 1 and shows a cross section of the column spacer and its base formed in the red pixel.

FIG. 3-2 is a cross-sectional view schematically showing the pixel taken along dashed line C-D in FIG. 1 and shows a cross section of a part where the column spacer is conventionally arranged in the green or blue pixel.

EXPLANATION OF NUMERALS AND SYMBOLS

Figure 1:
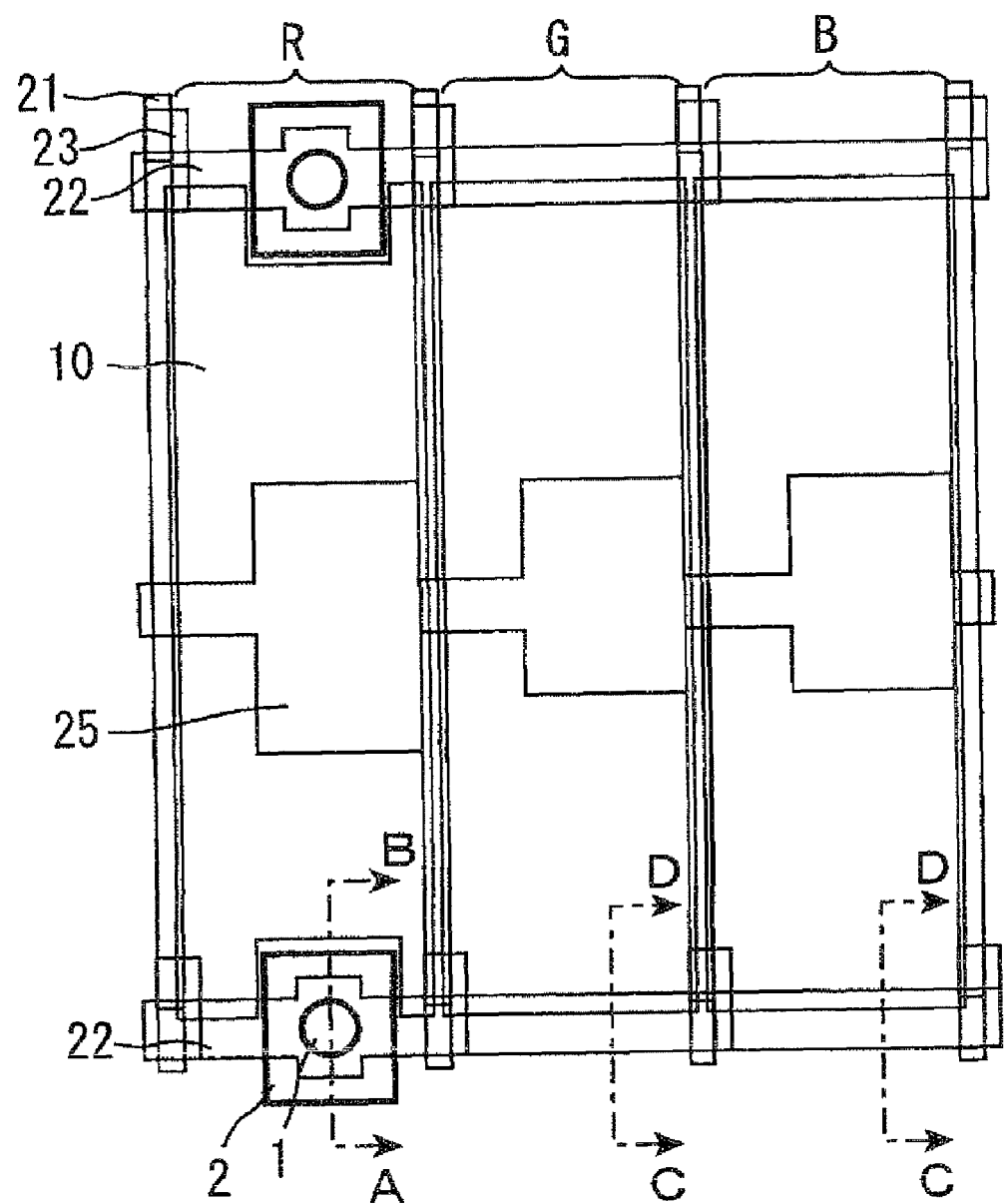
FIG. 1 is a planar view schematically showing the respective pixels of red, green, and blue in the liquid crystal display device in Embodiment 1.
Figure 2:
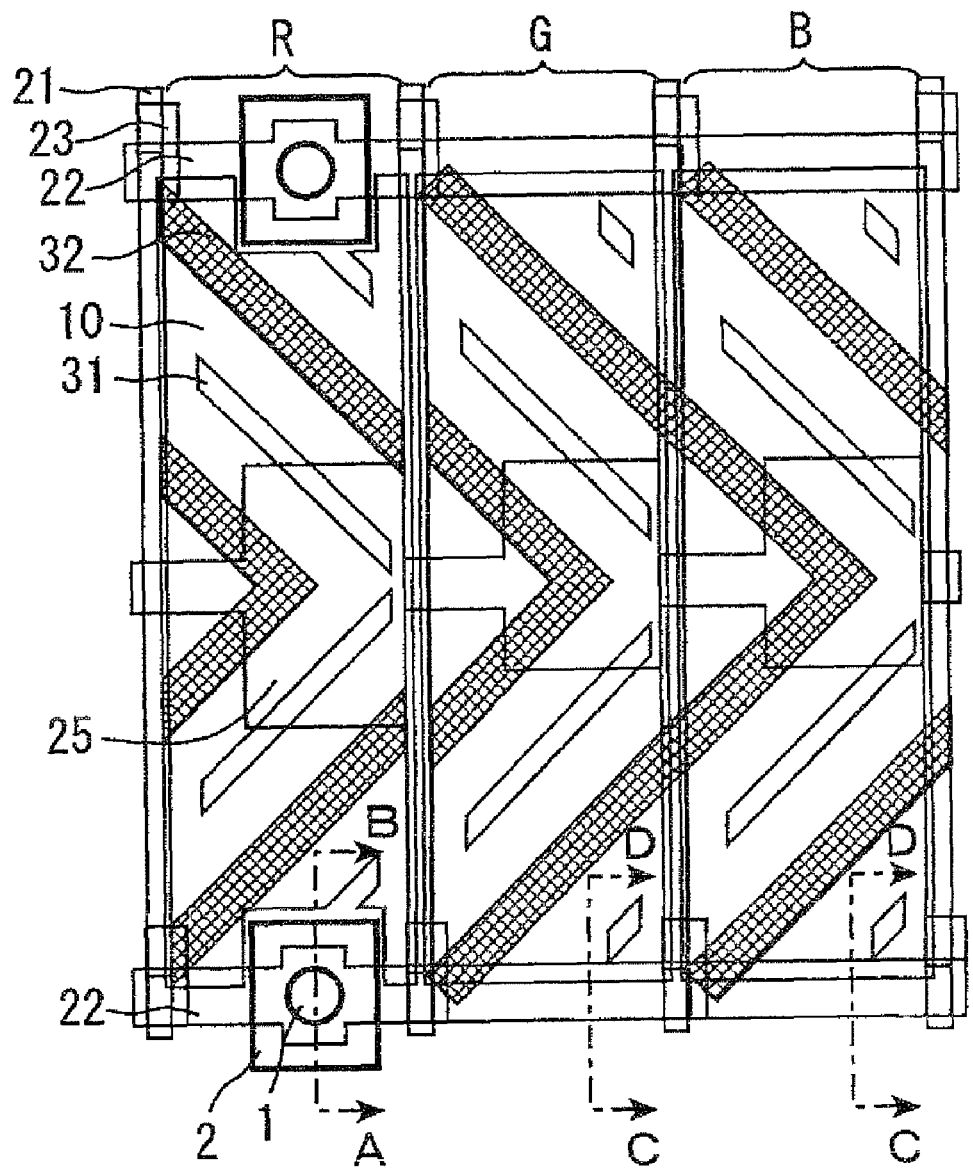
FIG. 2 is a planar view schematically showing the embodiment in which the pixels shown in FIG. 1 are provided with the alignment control structure such as a rib and an electrode slit.
Figures 1, 3:
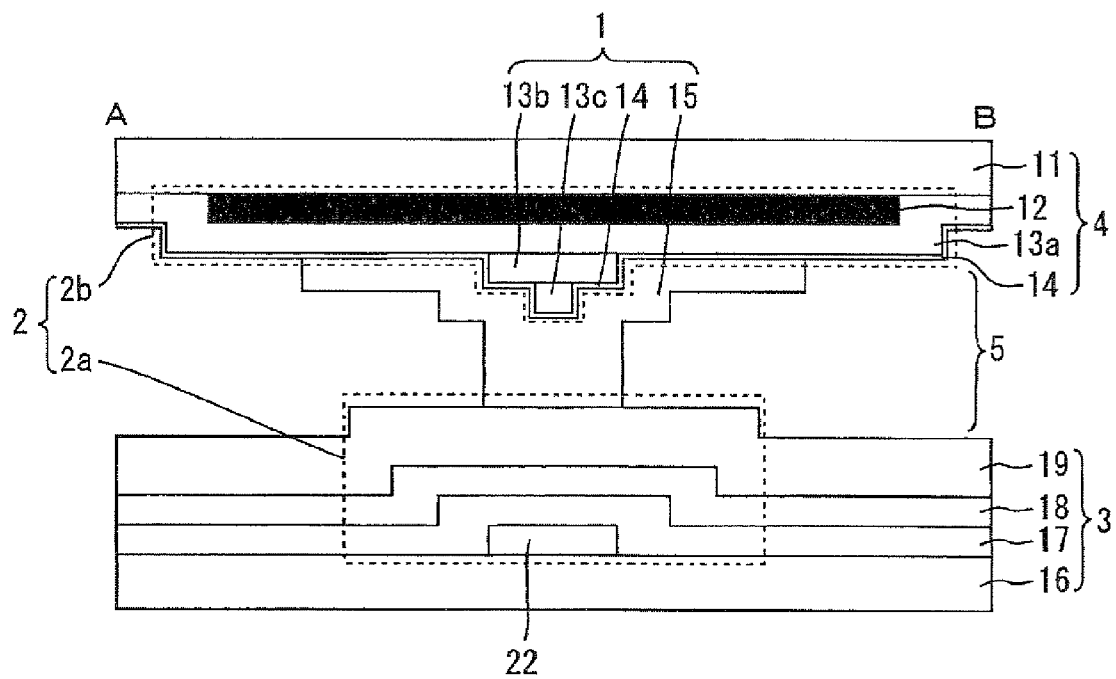
Figures 2, 3:
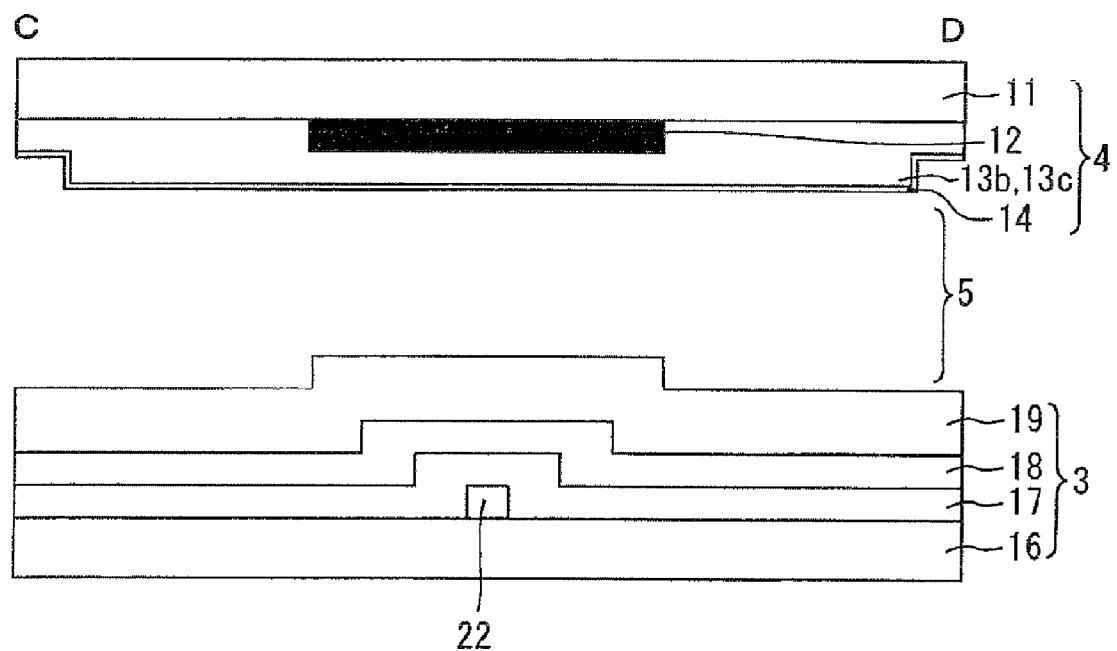
Figure 4:
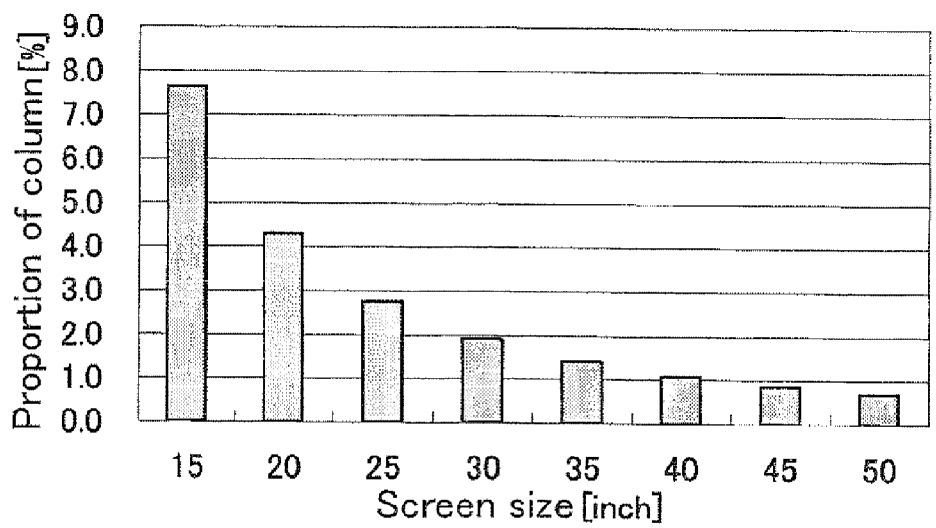
FIG. 4 is a graph showing one example of the proportion of the column spacer structure in the area of one pixel, in each screen size of the liquid crystal display device.
Figure 5:
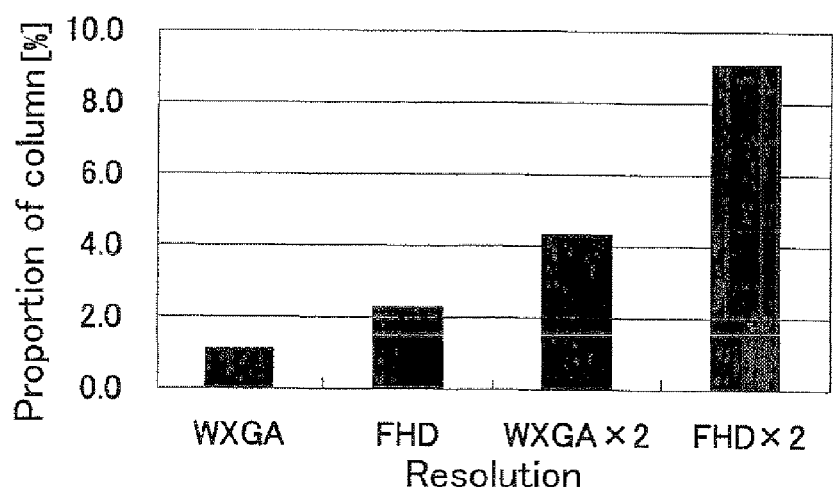
FIG. 5 is a graph showing one example of the proportion of the column spacer structure in the area of one pixel, in each resolution of the pixel in the liquid crystal display device.
Figure 6:
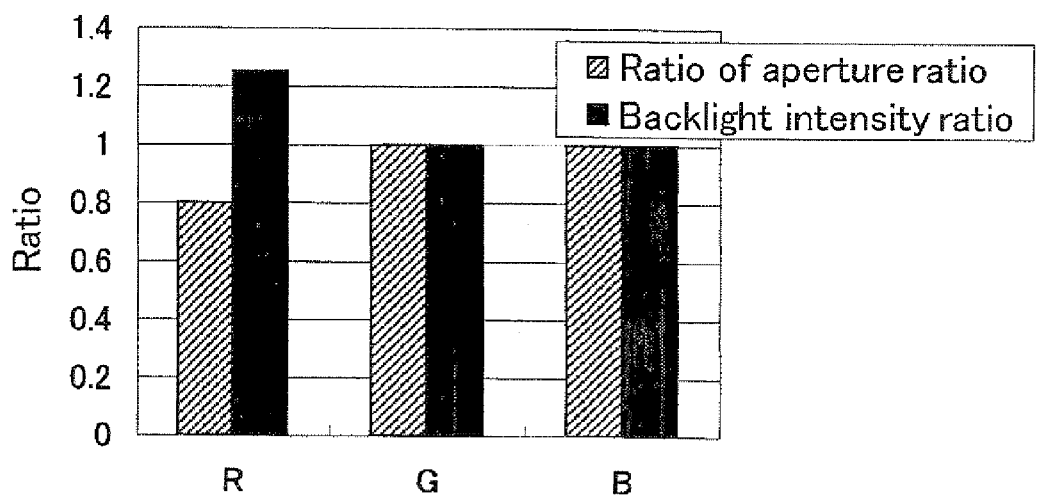
FIG. 6 is a graph showing one example of the intensity ratio of the respective color components included in light emitted from the backlight.
Figure 7:
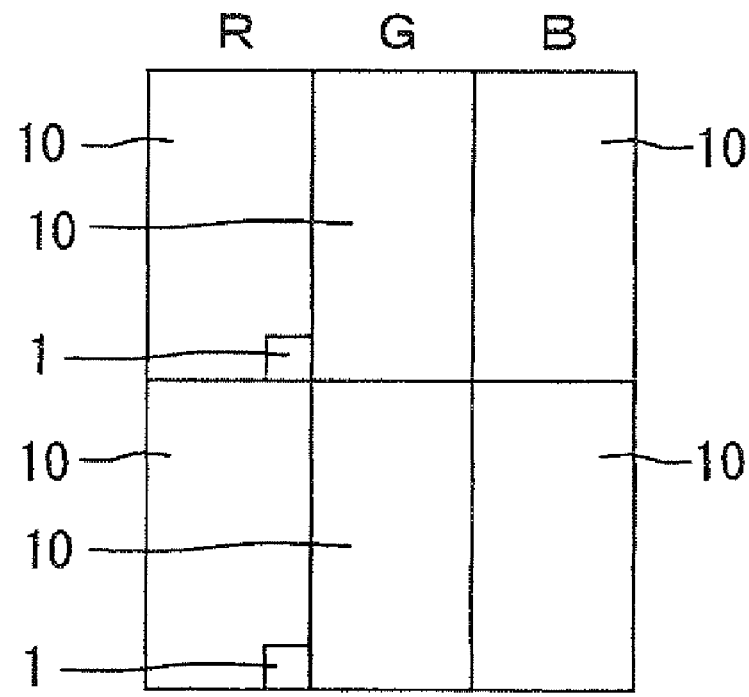
FIG. 7 is a planar view schematically showing arrangement of the column spacer of the present invention.
Figure 8:
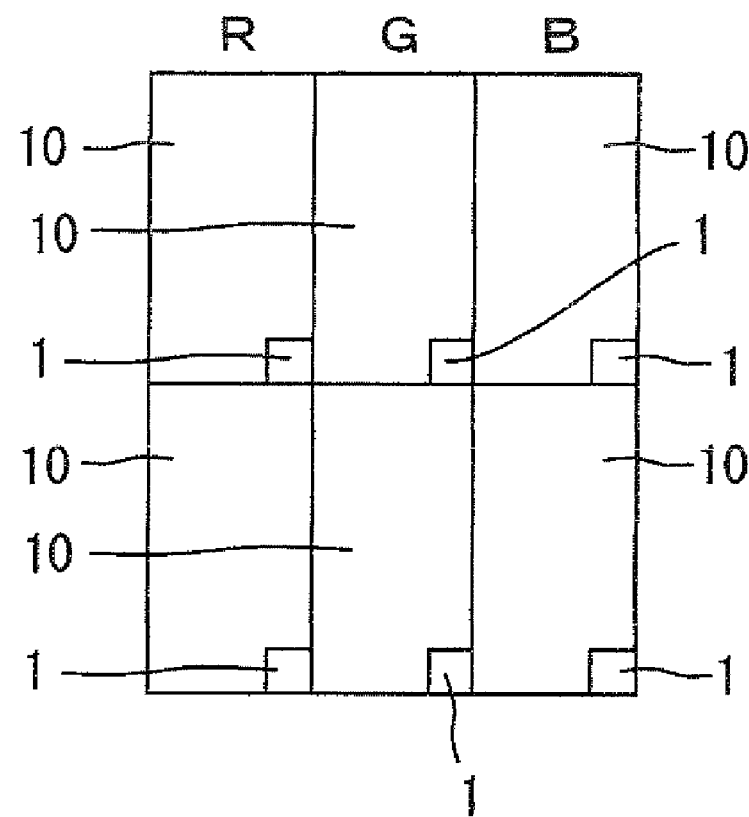
FIG. 8 is a planar view schematically showing the conventional column spacer arrangement.

1: Column spacer
2: Base
2a: Base (array substrate side)
2b: Base (color filter substrate side)
3: Array substrate
4: Color filter substrate
5: Liquid crystal layer
10: Pixel electrode
11: Transparent substrate
12: Black matrix (BM)
13a: Red colored layer
13b: Green colored layer
13c: Blue colored layer
14: Common electrode
15: Resin layer
16: Transparent substrate
17: Gate insulating film
18: Passivation film
19: Interlayer insulating film
21: Source wiring (signal line)
22: Gate wiring (scanning line)
23: TFT
25: Storage capacitor wiring
31: Electrode slit
32: Rib
R: Red pixel
G: Green pixel
B: Blue pixel

The invention claimed is:

1. A liquid crystal display device comprising:
a pair of substrates and a liquid crystal layer interposed between the pair of substrates, and
the liquid crystal display device comprising a red pixel, a green pixel, and a blue pixel, wherein a column spacer structure is arranged in the red pixel among three pixels of the red, green, and blue pixels, and
the red pixel has the smallest aperture ratio of the three pixels, and wherein said three pixels are proximate each other and of the three pixels the column spacer is provided only in the red pixel and not in the blue and green pixels.

2. The liquid crystal display device according to claim 1, further comprising a backlight, wherein among red, green, and blue lights emitted by the backlight, the red light is emitted at the highest intensity.

3. The liquid crystal display device according to claim 1, further comprising a scanning line on at least one of the pair of substrates, wherein a part of the scanning line in the green or blue pixel has a width smaller than a width of the scanning line in the red pixel.

4. The liquid crystal display device according to claim 1, wherein an area of the column spacer structure accounts for 2% or more of an area of one pixel.

5. The liquid crystal display device according to claim 1, comprising a pixel electrode in each pixel, wherein an area of the pixel electrode in the green and blue pixels is larger than an area of the pixel electrode in the red pixel.

6. The liquid crystal display device according to claim 5, wherein the red pixel has the highest storage capacitance of the three pixels.

7. The liquid crystal display device according to claim 6, further comprising a storage capacitor wiring on at least one of the pair of substrates, wherein a part of the storage capacitor wiring in the red pixel has a width larger than a width of the storage capacitor wiring in the green and blue pixels.

8. The liquid crystal display device according to claim 5, comprising a scanning line, a signal line, a switching element, and the pixel electrode on one of the pair of substrates, the switching element being electrically connected to the scanning line and the signal line, the pixel electrode being electrically connected to a drain electrode of the switching element, and the liquid crystal display device further comprising a common electrode on the other of the pair of substrates, wherein the pixel electrode and the common electrode form a liquid crystal capacitance, one of the pixel electrode and the drain electrode, and one of a storage capacitor wiring and the scanning line, form a storage capacitance, the scanning line and the drain electrode form a gate drain capacitance, and a ratio between the gate drain capacitance, and a total of a liquid crystal capacitance, the storage capacitance and the gate drain capacitance is the same among the red, green, and blue pixels.

9. The liquid crystal display device according to claim 5, wherein a linear alignment control structure divides each of the red, green, and blue pixels into a plurality of alignment regions different in alignment direction of liquid crystals, and an area ratio among the plurality of alignment regions is the same among the red, green, and blue pixels.

10. A liquid crystal display device comprising:
a pair of substrates and a liquid crystal layer interposed between the pair of substrates, and
the liquid crystal display device comprising a red pixel, a green pixel, and a blue pixel,
wherein a column spacer structure is arranged in the red pixel among three pixels of the red, green, and blue pixels, and
the red pixel has the smallest aperture ratio of the three pixels, and wherein said three pixels are proximate each other and of the three pixels the column spacer is provided in the red pixel but not in the blue and/or green pixels.

11. The liquid crystal display device according to claim 10, further comprising a backlight, wherein among red, green, and blue lights emitted by the backlight, the red light is emitted at the highest intensity.

12. The liquid crystal display device according to claim 10, further comprising a scanning line on at least one of the pair of substrates, wherein a part of the scanning line in the green or blue pixel has a width smaller than a width of the scanning line in the red pixel.

13. The liquid crystal display device according to claim 10, wherein an area of the column spacer structure accounts for 2% or more of an area of one pixel.

14. The liquid crystal display device according to claim 10, comprising a pixel electrode in each pixel, wherein an area of the pixel electrode in the green and blue pixels is larger than an area of the pixel electrode in the red pixel.

15. The liquid crystal display device according to claim 10, wherein the red pixel has the highest storage capacitance of the three pixels.

* * * * *